Feb. 5, 1946.   J. W. OVERBEKE   2,394,401
SECTIONAL ACCUMULATOR
Filed Feb. 28, 1944
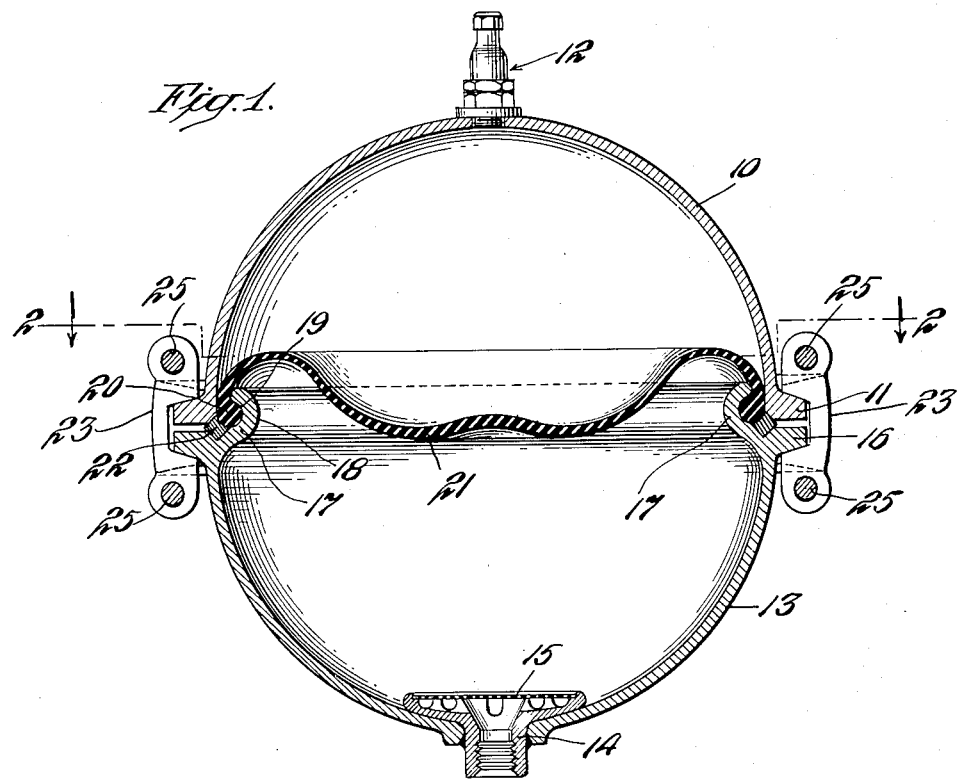
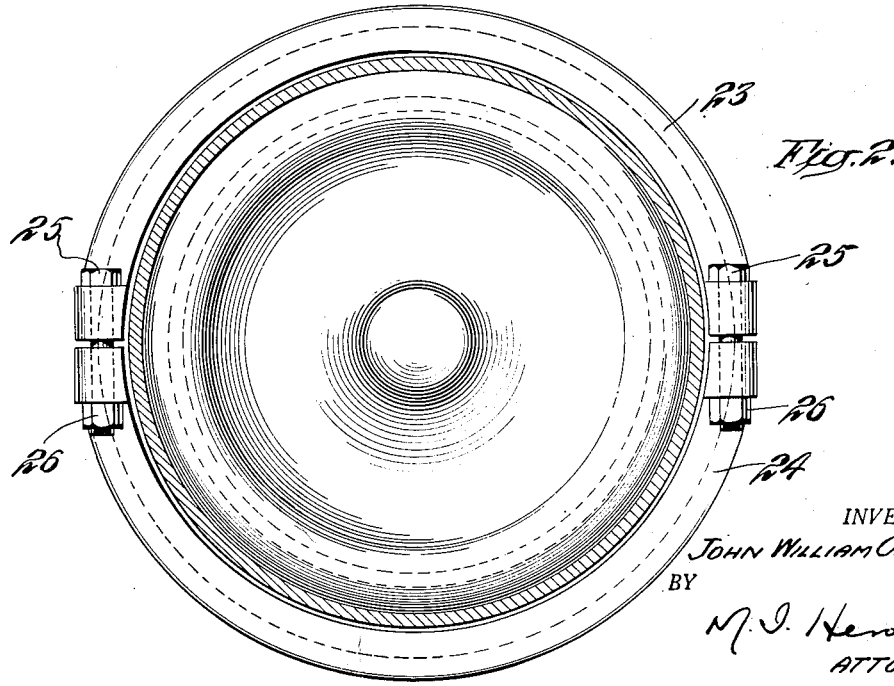
INVENTOR.
JOHN WILLIAM OVERBEKE
BY
M. J. Herold
ATTORNEY Patented Feb. 5, 1946

2,394,401

UNITED STATES PATENT OFFICE 2,394,401

SECTIONAL ACCUMULATOR

John William Overbeke, New York, N. Y., assignor to Simmonds Aerocessories, Inc., New York, N. Y., a corporation of New York Application February 28, 1944, Serial No. 524,198

2 Claims. (Cl. 138—30)

This invention relates to pressure vessels such as accumulators and surge relievers of the kinds used in aircraft or boats wherein a fluid is stored or pumped under pressure and more especially to those forms of pressure accumulators wherein a liquid such as oil and a compressible gas such as air are charged under pressure in a shell where they are separated by a flexible membrane or diaphragm.

General objects of the invention are to provide accumulators of the central diaphragm type having improved features of construction leading to better performance and longer service life.

More particular objects of the invention are to provide diaphragm equipped accumulators of sectional hemispheric form having an improved joint construction characterized by great strength, adaptability to simple manufacturing methods, an effective fluid tight means for holding the diaphragm, and means for guiding and protecting the held edges of the diaphragm during flexure.

Other objects of the invention will in part be obvious and will in part appear hereinafter.

The invention accordingly comprises the features of construction, combination of elements, and arrangement of parts, which will be exemplified in the construction hereinafter disclosed, and the scope of which invention will be indicated in the claims.

For a fuller understanding of the nature and objects of the invention reference should be had to the following detailed description taken in connection with the accompanying drawing, in which:

Fig. 1 is a central vertical sectional view through an accumulator embodying features of the invention;

Fig. 2 is a horizontal sectional view along line 2—2 of Fig. 1.

Referring more particularly to the drawing, the present accumulator comprises a sectional shell having ends which are preferably hemispherical but may be of ovate or other suitable form. The upper section 10 is of plain construction readily amenable either to drop forging or to pressing and terminates in an edge flange 11 the base of which is sufficiently thick to possess adequate shear resistance. The upper surface of flange 11 has a tapered wedge form. At the upper end of shell section 10 a conventional air introducing back check valve 12 is provided.

The lower shell section 13 which also may be readily forged or pressed is equipped with an oil passing plug 14 having a perforate plate 15 which prevents extrusion of the later described diaphragm at such times as there is no oil within the shell. The details of this oil plug are more particularly described and claimed in my copending application, Ser. No. 515,934, filed December 28, 1943.

At its terminal edge the lower shell section is provided with an out-turned flange 16 complementing flange 11 and also having a tapered wedge surface. Adjacent this terminal edge there is provided an internally extending circular rib or bead 17 having an interior gently curved or rounded surface 18 of appreciable radius and an outwardly facing retaining groove 19. In this groove there is seated the thickened more or less circularly beaded edge 20 of a flexible diaphragm 21 made of preferably elastic rubber-like material. Synthetic rubbers having high oil swell resistance coupled with good flexibility and elasticity over a wide temperature range are suitable. The bead 20 may be preferably dimensioned to snap into its seating groove 19. This bead also bears against a deformable sealing gasket 22 of diaphragm material, leather, or the like, which as shown seats in a groove disposed between the flange 15 and rib 17 and bears against a mating beveled surface provided at the inner terminal edge of the upper shell section. It will be noted that the sealing arrangement is such that no metal to metal contact need occur between the shell sections with consequent avoidance of precise fitting or machining requirements. The wedge face on the upper shell directs the gasket inwardly in tight sealing engagement against the diaphragm bead when the shell sections are drawn together.

The diaphragm 21 is preferably dimensioned so that when inert it occupies a position walling off the upper third of the entire shell, but is sufficiently elastic and distensible to be forced downwardly into complete occupation of the lower part of the shell at such times as there is no oil in the accumulator. With such an arrangement, air may be charged into the accumulator at an initial pressure of 600 p. s. i. with no oil inside the shell which pressure is increased to a normal operating pressure of about 1500 p. s. i. when sufficient oil under pressure is introduced to force the diaphragm bag more or less to its normally inert or unstretched position. These figures are, of course, merely illustrative. This flexure of the diaphragm places the clamped edge under considerable fatigue and tearing stress which has been a source of trouble in many previous accumulators. Here it will be noted that the gently curving rib 18 supports and guards the retained edge of the diaphragm during its flexure and invagination into the lower part of the shell, preventing an abrupt creasing of the held edge and materially increasing the service life of the diaphragm. Such a protecting and supporting bead or rib may take various forms and may be applied with advantage to one or both sections of any diaphragm holding shell, whether of the particular ribbed and gasketed form illustrated here, or of other known or suitable types.

A clamping ring comprising sections 23 and 24 is provided which embraces the flanges 11 and 16 and has corresponding tapered wedging surfaces engageable over the tapered wedge surfaces of such flanges. These clamping ring sections are drawn together by through bolts 25 and nuts 26 which, when tight, wedge the two halves of the shell firmly together against the sealing gasket 22.

It will be seen that an accumulator of simple and sturdy construction has been provided which is capable of being readily manufactured and which by virtue of its rugged construction and especially of the protective rolling bead for the diaphragm possesses a long service life.

Since certain changes may be made in the above construction and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described my invention, what I claim as new and desire to secure by Letters Patent, is:

1. A pressure accumulator comprising a shell section having a confining rib extending from its terminal edge, a second shell section, an inwardly deformable gasket between said sections, a wedge face on at least one of said sections capable of directing said gasket inwardly, a diaphragm having its edges between said rib and the second shell section, and means for drawing and holding said sections together while clamping said gasket inwardly against an edge of said diaphragm.

2. A pressure accumulator comprising a shell section having a confining rib extending inwardly near its terminal edge and having a gently rounded inwardly facing surface and an outwardly facing retaining groove, a second shell section having an inwardly facing wedge surface, a diaphragm having a beaded edge disposed in said groove, an inwardly deformable gasket between said sections having a side abutting said beaded edge in sealing relation therewith and another sloped side engaging said wedge surface, and means for drawing and holding said sections together while wedging said gasket inwardly against said beaded edge, said rib opposing such inward wedging and serving to guide said diaphragm around a pronounced curve during flexure.

JOHN WILLIAM OVERBEKE.